United States Patent [19]
Hao et al.

[11] Patent Number: 6,115,027
[45] Date of Patent: Sep. 5, 2000

[54] SYNCHRONIZED CURSOR SHARED AMONG A NUMBER OF NETWORKED COMPUTER SYSTEMS

[75] Inventors: Ming C. Hao, Los Altos Hills; Joseph S. Sventek, Oakland, both of Calif.; Dongman Lee, Taejon, Rep. of Korea

[73] Assignee: Hewlett-Packard Company, Palo Alto, Calif.

[21] Appl. No.: 09/028,172

[22] Filed: Feb. 23, 1998

[51] Int. Cl.[7] .................................................. G06F 3/14
[52] U.S. Cl. .......................... 345/145; 345/329; 345/339; 345/332; 345/157; 709/201; 709/202; 709/237
[58] Field of Search .................................... 345/329, 339, 345/145, 157, 332, 331, 330; 709/201, 202, 205, 237, 248

[56] References Cited

U.S. PATENT DOCUMENTS

| | | | |
|---|---|---|---|
| 4,731,745 | 3/1988 | Katagiri et al. | 348/141 |
| 4,975,690 | 12/1990 | Torres | 345/340 |
| 5,168,269 | 12/1992 | Harlan | 345/145 |
| 5,339,388 | 8/1994 | Bates et al. | 345/331 |
| 5,511,185 | 4/1996 | Weinbum et al. | 714/38 |
| 5,548,304 | 8/1996 | Yoshino et al. | 345/145 |
| 5,796,396 | 8/1998 | Rich | 345/331 |
| 5,835,904 | 11/1998 | Vicik et al. | 701/1 |
| 5,867,156 | 2/1999 | Beard et al. | 345/332 |

*Primary Examiner*—Raymond J. Bayerl
*Assistant Examiner*—Thomas T. Nguyen
*Attorney, Agent, or Firm*—Thoma X. Li

[57] ABSTRACT

A non-intrusive cursor synchronization system is described that does not change or modify the existing system or application. The cursor synchronization system is used for synchronously displaying a cursor on a plurality of display systems connected together via a network without requiring database or shared memory. The cursor synchronization system includes a plurality of agents, each being coupled to one of the display systems to cause the respective display system to display a consistent cursor movement, and to trigger concurrent execution among a number of existing applications. The cursor synchronization system also includes a cursor synchronizer that captures and compresses the cursor movement generated from one of the display systems within a time interval that is adjustable based on the speed at which the user moves the cursor. The cursor synchronizer synchronously sends the compressed cursor movement to each of the agents such that the cursor movement is synchronously displayed on each of the display systems with minimized network traffic through the network. A method for synchronously displaying a cursor on a plurality of display systems connected together via a network is also described.

9 Claims, 6 Drawing Sheets

| | SYNC PIECE 1 | SYNC PIECE 2 | SYNC PIECE 3... | SYNC PIECE n |
|---|---|---|---|---|
| DISPLAY 1 (PARTICIPANT 1) (FLOOR HOLDER) | ▨◉▢▨ 1 2 3 4 SEND | ▢▨◉▢▨ 1 2 3 4 5 SEND | ▢▨◉▨ IDLE 1 2 3 SEND | IDLE |
| DISPLAY 2 (PARTICIPANT 2) | ▨◉ 1 2 | ▨◉ ▨ 2 3 5 | ▨ 3 | |
| DISPLAY 3 (PARTICIPANT 3) | ▨◉ 1 2 | ▨◉ ▨ 2 3 5 | ▨ 3 | |

▢ INDICATES COMPRESSED CURSOR LOCATION IN A SYNC PIECE

▨ INDICATES LAST CURSOR LOCATION IN A SYNC PIECE OR THE LAST CURSOR LOCATION BEFORE A MOUSE BUTTON/KEYBOARD OPERATION

◉ INDICATES MOUSE/KEYBOARD OPERATION

SYNCHRONIZED CURSOR SHARED AMONG A NUMBER OF NETWORKED COMPUTER SYSTEMS

BACKGROUND OF THE INVENTION

1. Field of the Invention

The present invention pertains to networked computer systems concurrently sharing an application. More particularly, this invention relates to a non-intrusive synchronized cursor shared among a number of networked computer systems without requiring a central database or shared memory that allow concurrent execution of multiple copies of applications.

2. Description of the Related Art

Industries that manufacture motor vehicles, airplanes, and other complex equipment typically require designers and engineers to work concurrently on the same design. The ability to work concurrently on the same design allows multiple users to collaborate on design changes in real-time, thus reducing overall design time and improving the quality of the final designed product.

With the advance of computer technologies, computer systems allow designers and engineers to electronically capture and manipulate multidimensional design image/graphics. The computer software that electronically captures, displays and manipulates images or graphics displayed on a computer screen is referred to generally as an application. In order for more than one user to view or work on the same electronically captured graphics or image at the same time regardless of the users' physical locations, the users' computer systems are connected together as a network and the application is shared by each user's system concurrently. The shared application should provide concurrent and consistent views (windows) of the same graphics in real time at each use's system.

Existing shared applications are based on two general architectures. The two general architectures are referred to as a centralized architecture and a replicated architecture. A centralized architecture contains only one instance (i.e., copy) of the shared application. Inputs to the application are sent to a single execution system. The application's output at the execution system is then sent to each user display. The centralized architecture provides identical views by transmitting the same protocol to each user display.

View consistency problems typically do not occur in centralized architectures since only one copy of the shared application is executed. However, centralized architectures must transfer all input and output ("I/O") data between each user site and the shared application at the execution site. This I/O data transfer increases network traffic between the user and execution sites. Because networks have limited bandwidth, one major disadvantage of the centralized shared application architecture is that only a limited number of users can use a centralized shared application architecture at the same time.

The replicated architecture executes a copy of the shared application locally at each user's system. User inputs and outputs to and from the shared application remain localized on the user's system. Replication architectures significantly reduce network traffic and have faster response times since I/O data remains localized at the users' systems. However, one disadvantage of the replication architectures is that they typically have difficulty maintaining synchronized motion views among the multiple copies of the graphic application displayed on each user's system. One reason of the difficulty in maintaining synchronized motion views is that the networked systems may have different speeds and/or system performances such that some of the systems run slower than other systems. The other reason of the difficulty in maintaining synchronized motion views is that the network typically causes delays in signal transmission.

Inconsistency of the cursor movements in a replication architecture typically causes problem in real time concurrent execution and consistent graphical views across multiple copies of a shared application. This is typically not acceptable in concurrent engineering. Concurrent engineering means concurrent team design at graphically dispersed sited. During concurrent engineering, the team members typically need to view the synchronized cursor movements and to trigger the same and concurrent operations. When the cursor movements and function triggering actions (i.e., button actions) are not synchronized in all of the systems, inconsistent display of the cursor movements and inconsistent behavior of the application will typically result.

SUMMARY OF THE INVENTION

One feature of the present invention is to allow synchronized cursor movement on all display systems connected together via a network.

Another feature of the present invention is to allow synchronized cursor movement on all display systems connected together via a network in a replicated architecture with minimized data traffic along the network.

A further feature of the present invention is to allow synchronized cursor movement in a replicated application sharing architecture to allow simultaneous application execution and consistent views.

A still further feature of the present invention is to provide a non-intrusive mechanism for allowing synchronized cursor movement on all display systems connected together via a network.

A cursor synchronization system is described that is used for synchronously displaying a cursor on a plurality of display systems connected together via a network. The cursor synchronization system includes a plurality of agents, each being coupled to one of the display systems to cause the respective display system to display a cursor movement. The cursor synchronization system also includes a cursor synchronizer that captures and compresses the cursor movement generated from one of the display systems within a predetermined time interval. The cursor synchronizer synchronously sends the compressed cursor movement to each of the agents such that the cursor movement is synchronously displayed on each of the display systems with minimized network traffic through the network.

A method for synchronously displaying a cursor on a plurality of display systems connected together via a network is also described. The method includes the step of capturing a cursor movement generated from one of the display systems within a predetermined time interval. Then the cursor movement is compressed by dividing the cursor movement into a plurality of movement pieces and using the last cursor location within each of the movement pieces to represent the cursor movement. Then, all the last cursor locations within all of the movement pieces are synchronously sent to each of the display systems such that the cursor movement is synchronously displayed on each of the display systems with minimized network traffic through the network.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
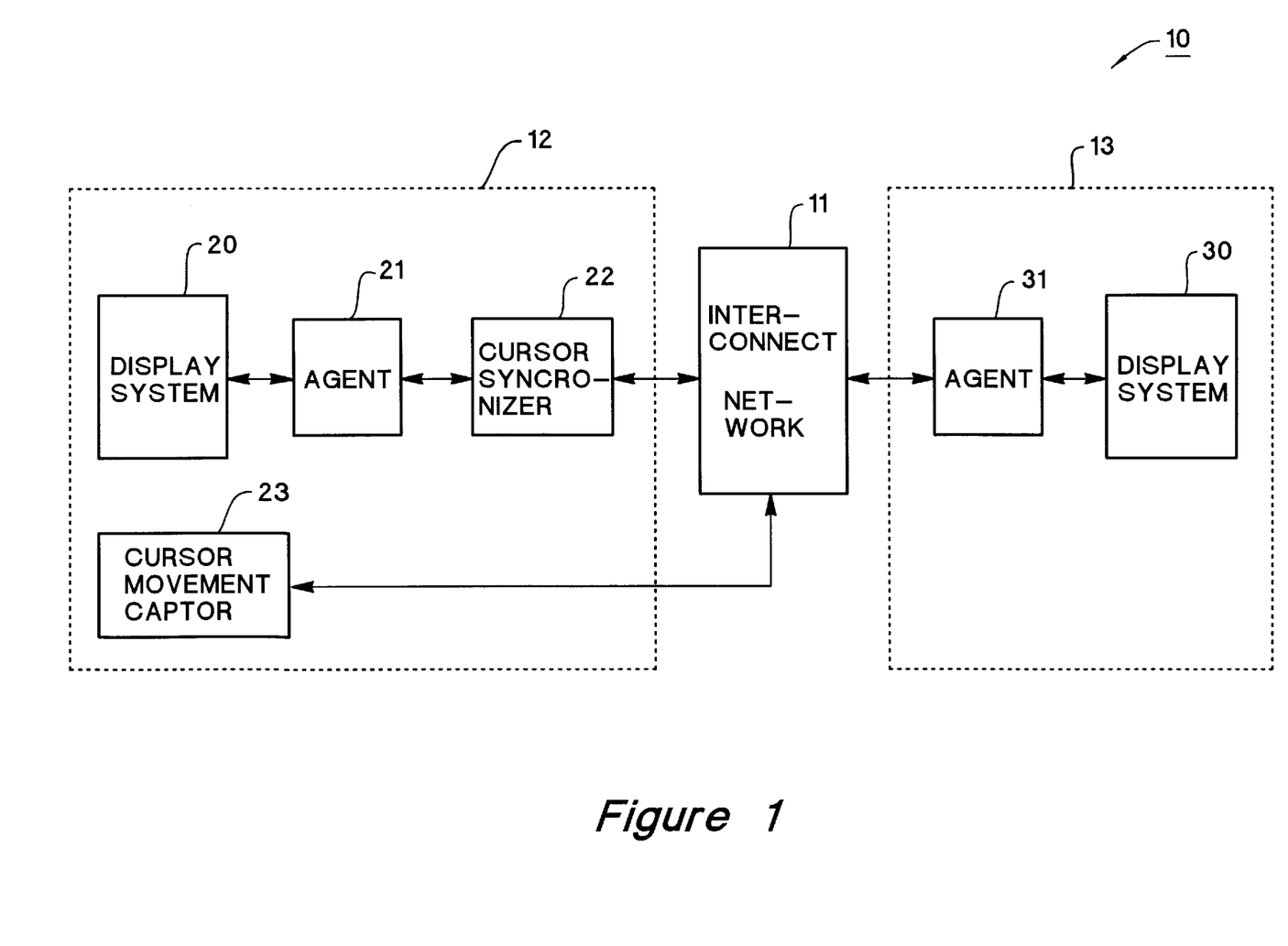
FIG. 1 shows a cursor synchronization system according to one embodiment of the present invention, wherein the cursor synchronization system includes a cursor synchronizer and a number of agents.

FIG. 1 shows a cursor synchronization system 10 that implements one embodiment of the present invention. The cursor synchronization system 10 in accordance with one embodiment of the present invention allows synchronized cursor movement on all display systems (e.g., the display systems 20 and 30) that are connected together via a network 11. The cursor synchronization system 10 does this in a non-intrusive manner and does not require any change of the display systems. This means the cursor synchronization system 10 is non-intrusive and does not change or modify existing system, software, or applications. The display systems can be computer-enabled display systems and may have different processing speeds and/or performances. The display systems are located in different remote sites. For example, the remote site 12 includes a display system 20 and the remote site 13 includes a display system 30.

In addition, the cursor synchronization system 10 in accordance with one embodiment of the present invention allows synchronized cursor movement on all display systems with minimized data traffic along the network 11. In one embodiment, the cursor synchronization system 10 allows simultaneous concurrent application execution and consistent graphical views between remote sites (i.e., the remote sites 12 and 13).

As will be described in more detail below, the cursor synchronization system 10 includes a number of agents (e.g., agents 21 and 31), each being connected to a respective one of display systems (e.g., the display system 20 or 30). In addition, the cursor synchronization system 10 includes a cursor synchronizer 22 and a cursor movement captor 23 coupled to the cursor synchronizer 22. The cursor synchronizer 22 is also coupled to the agents (e.g., the agents 21 and 31).

The cursor movement captor 23 captures the cursor movement and/or button/keyboard actions occurred in one of the display systems (e.g., the display system 20) within a predetermined time interval. The cursor movement captor 23 then sends the data of the captured cursor movement and/or button/keyboard actions to the cursor synchronizer 22.

The cursor synchronizer 22 compresses the data of the cursor movement received from the cursor movement captor 23. The cursor synchronizer 22 does this by dividing the cursor movement into a number of movement pieces and only transmitting the last cursor location within each movement piece. This compression scheme is referred to as the piece-wise compression. The piece-wise compression is performed in order to minimize data traffic along the interconnect network 11. When a mouse button and/or keyboard action occur in a movement piece, the cursor location prior to the button/keyboard action within that movement piece is also marked as an additional last cursor location within that movement piece. This is referred to as To-Location scheme which makes sure that the button/keyboard action is synchronized at the same location on all of the display systems.

The cursor synchronizer 22 then sends the compressed cursor movement to each of the agents (e.g., the agents 21 and 31). The transmission is done synchronously from the cursor synchronizer 22 to all agents via the network 11. The agents then cause the cursor movement to be displayed on each of the display systems of the cursor synchronization system 10. In this way, the cursor movement is synchronously displayed on all of the display systems of the cursor synchronization system 10. The cursor synchronization system 10 will be described in more detail below, also in conjunction with FIGS. 1 through 6.

The cursor synchronization system 10 is capable for conducting a real-time concurrent collaboration session (i.e., concurrent engineering). This means that each of the display systems within the cursor synchronization system 10 includes CAD/CAM applications, multimedia applications, or any other existing applications that can electronically capture, display, and manipulate multiple replicated views (images or graphics) in real-time. These applications are shared by all display systems of the cursor synchronization system 10 using known application sharing schemes or technologies.

As can be seen from FIG. 1, the network 11 is connected to the display systems 20 and 30 via the respective agents 21 and 31. The interconnect network 11 can be any known network, such as local area network (LAN), Integrated Services Digital Network (ISDN), ADSL network, T-1 or T-3 link, cable or wireless LMDS network, telephone network, or Fiber Distributed Data Interface (FDDI) network. Alternatively, the interconnect network 11 can be any other known network.

The display system 20 is within the remote site 12 and the display system 30 is within the other remote site 13. Although FIG. 1 only illustrates two remote sites 12 and 13 for illustration purposes (each of the remote sites 12 and 13 includes one display system), many more remote sites may be connected to the network 11. In addition, each of the remote sites may include more than one display system.

The display systems 20 and 30 can be any known display systems. In one embodiment, each of the display systems 20 and 30 is a computer-enabled or computer-controlled display system. This means that each of the display systems 20 and 30 can operate in multimedia environment and can process and display graphics or images in three dimensional representation. In essence, each of the display systems 20 and 30 is a computer system having a display. The computer system can be a personal computer, a notebook computer, a workstation, a mini-computer, or a mainframe computer. Alternatively, other types of display systems can be used for each of the display systems 20 and 30.

The cursor synchronization system 10 has one site as the floor holder site or execution site and other sites as participant sites or user sites. The cursor movement is generated in the floor holder site of the cursor synchronization system 10 and is then sent (or multi-cast) to every display system of the system 10 for synchronous display. As can be seen from FIG. 1, the remote site 12 is regarded as the floor holder site of the cursor synchronization system 10 and the remote site 13 is regarded as the participant site for the system 10. This is only for illustration purpose and in practice, each site can become the floor holder site. A remote site is the floor holder site when the viewer of this site either is allowed to generate cursor movement or actually generates the cursor movement. In one embodiment, a remote site having one display system is a floor holder site if its user is allowed to generate cursor movement. In another embodiment, a remote site is a floor holder site whenever its user starts to generate cursor movement.

As can be seen from FIG. 1, the cursor synchronization system 10 includes the cursor movement captor 23 and the cursor synchronizer 22 within the site 12. This is because the site 12 is shown as the floor holder or execution site. If the site 13 is the floor holder site, the cursor movement captor 23 and the cursor synchronizer 22 will be within the site 13. When each of the sites 12 and 13 may become the floor holder site, each site includes its own cursor movement captor and cursor synchronizer. When one of sites becomes the floor holder site, its respective cursor movement captor and cursor synchronizer are activated and the cursor movement captor and cursor synchronizer in other sites do not function.

The cursor movement captor 23 and the cursor synchronizer 22 are used to capture and compress cursor movements, and to send the compressed cursor movements to all display systems of the cursor synchronization system 10 for synchronous and consistent display and execution. The cursor movement captor 23 is connected to an I/O controller (not shown in FIG. 1) for the display system 20. The I/O controller is connected to a keyboard and a cursor control device (both are not shown in FIG. 1). The cursor control device can be a mouse with buttons to activate various application functions, to select various command modes, or to input control signals. The function of the cursor movement captor 23 is to capture any cursor movement, keyboard action, and/or button action generated by the user through the keyboard and/or cursor control device within a predetermined time interval. Once the captor 23 captures the cursor movement, keyboard action, and/or button action within the predetermined time interval, the data of the captured cursor movement, keyboard action, and/or button action is then sent to the cursor synchronizer 22 for compression and for synchronous multi-casting to the agents of the system 10. The captor 23 then tries to capture another cursor movement, keyboard action, and/or button action, if any, during the next predetermined time interval.

In one embodiment, the predetermined time interval is approximately fifty milliseconds. Alternatively, the predetermined time interval can be longer or shorter than fifty milliseconds. The predetermined time interval is adjustable depending on the speed of the cursor movement.

The captor 23 can be implemented using known technologies. For example, the captor 23 can be implemented through the capture function of the shared application described above. Alternatively, the captor 23 can be implemented by other known means.

The cursor synchronizer 22 is used to transmit the captured cursor movement to each of the agents. In accordance with one embodiment of the present invention, this is done using a piece-wise synchronization to provide multiple consistent output views. In addition, the cursor synchronizer 22 compresses the captured cursor movement to reduce data traffic along the network 11. Moreover, the cursor synchronizer 22 uses a To-Location synchronization for the button/keyboard action to ensure concurrent execution. This means that a cursor position is immediately moved to the same location on each display system at which the keyboard/button action is to occur.

Figure 2:
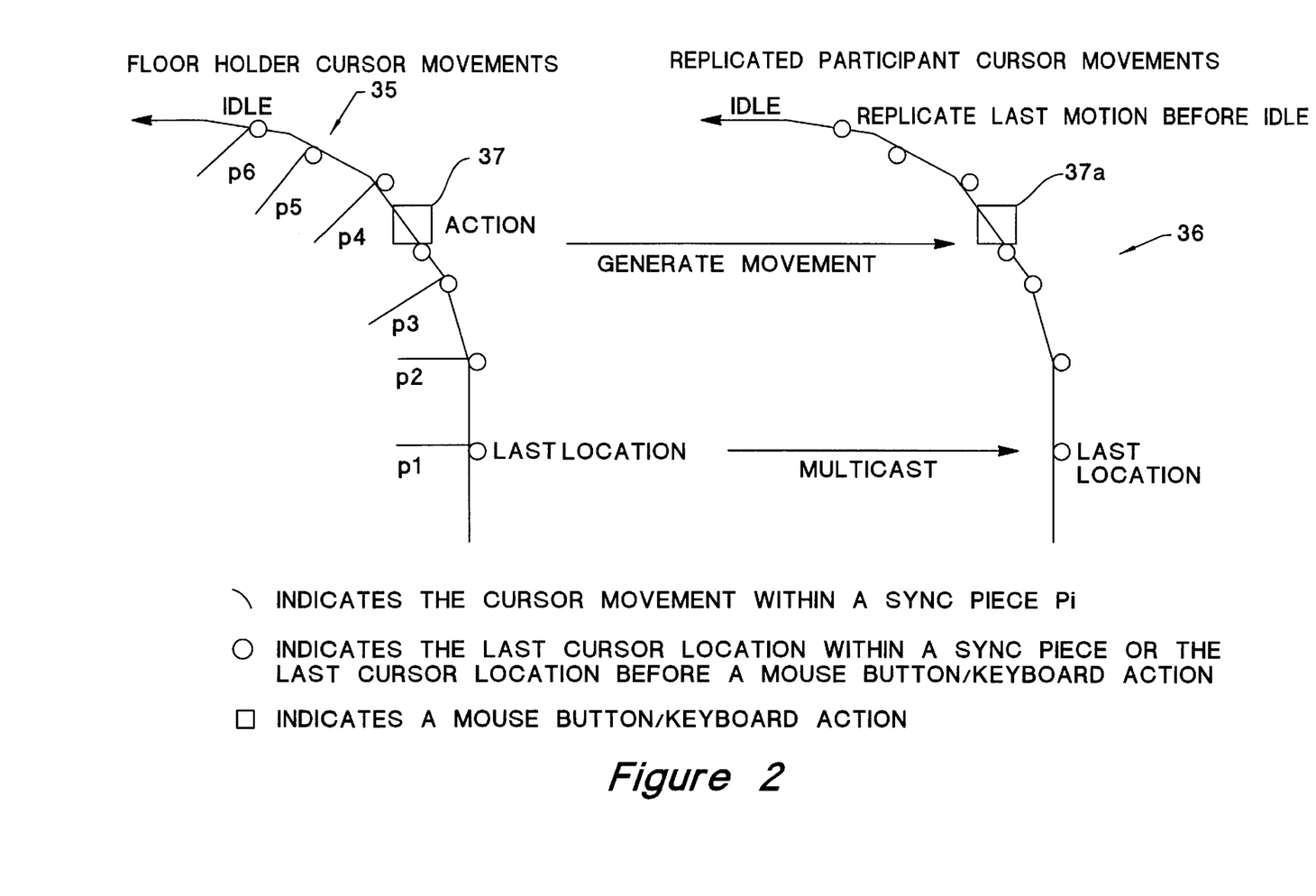
FIG. 2 illustrates how a cursor movement is synchronously displayed by the cursor synchronization system of FIG. 1.

FIG. 2 shows the piece-wise synchronization scheme of the cursor synchronizer 22. As can be seen from FIG. 2, reference number 35 indicates a captured cursor movement within the predetermined time interval and reference number 36 indicates the replicated cursor movement displayed on all display systems. The movement 35 includes a button/keyboard action 37 which is replicated as action 37a on the movement 36.

To ensure synchronized execution of functions and consistent view of the cursor movement 35, the cursor synchronizer 22 of FIG. 1 divides the cursor movement into a number of sync pieces in terms of time. Then the cursor synchronizer 22 sends the cursor movement in a first sync piece to all of the agents of the cursor synchronization system 10 at the end of that sync piece. The cursor synchronizer 22 then waits to receive a completion message from each of the agents before the cursor synchronizer 22 sends the cursor movement in a next sync piece to each of the agents. This ensures that the cursor movement at all display systems are synchronized at the end of each sync piece. The completion message indicates that the agent has displayed the cursor movement within the sync piece. Each agent generates the completion message once it has completed the process of displaying cursor movement within that sync piece. The sending of the completion message from each agent and the receiving the completion message by the cursor synchronizer 22 is like a handshaking mechanism between the agents and the cursor synchronizer 22. When the cursor movement on all of the display systems is out of synchronization at a particular sync piece, the cursor movement on all of the display systems will be synchronized at the next sync piece due to this handshaking mechanism.

The size of each sync piece is determined by the cursor movement speed. The higher the cursor movement speed, the smaller the size of each sync piece. In one embodiment, each sync piece is approximately five milliseconds long. Alternatively, each sync piece can be longer or shorter than five milliseconds.

Figure 3:
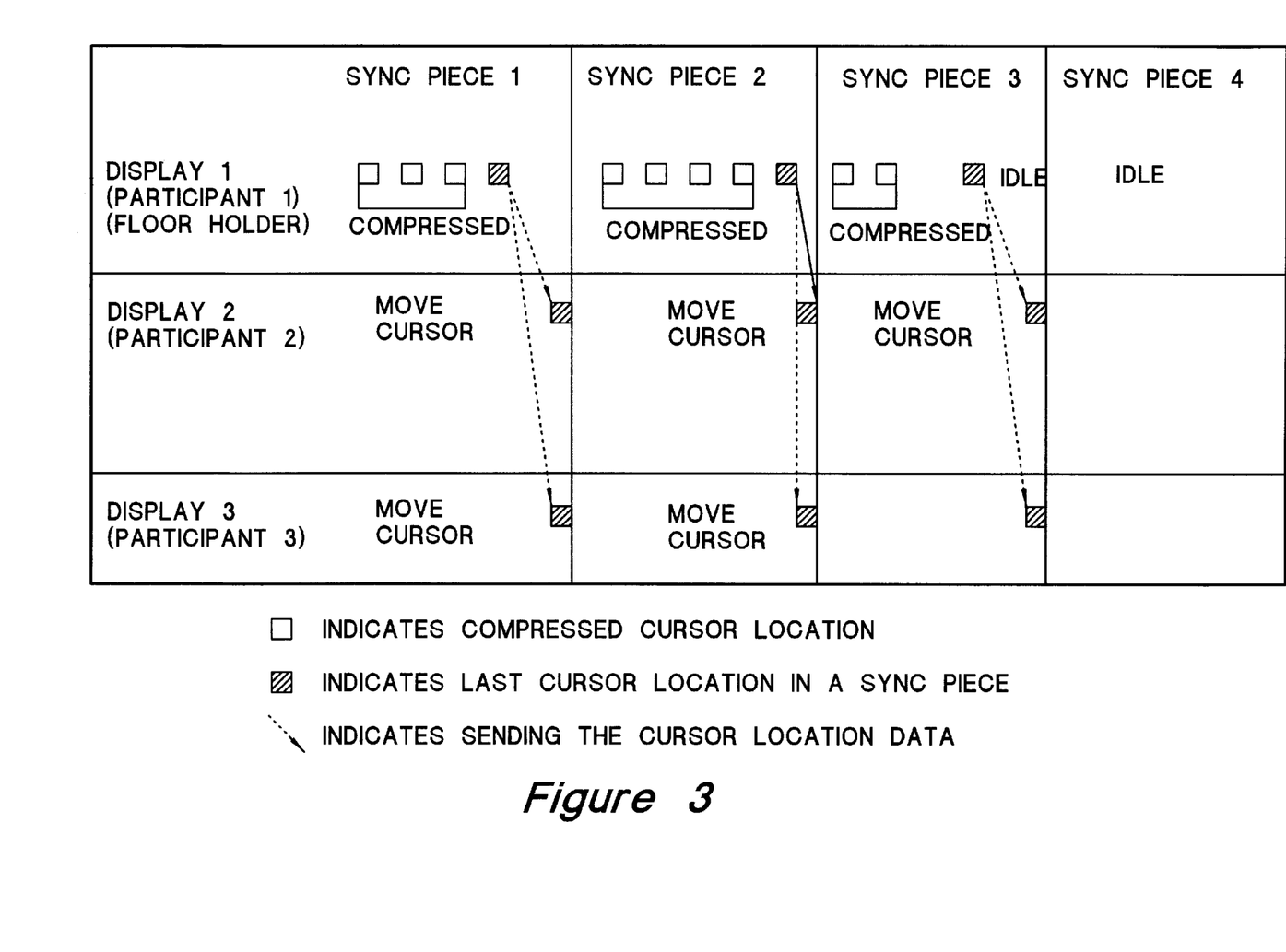
FIG. 3 shows the piece-wise cursor synchronization scheme of the cursor synchronization system of FIG. 1.

Before the cursor synchronizer 22 sends the cursor movement in each sync piece to all the agents, the cursor movement is compressed to reduce the data traffic on the network 11. This compression scheme performed by the cursor synchronizer 22 is also shown in FIG. 2. As can be seen from FIG. 2, because the time interval for the captured cursor movement 35 is divided into a number of sync pieces (i.e., $P_1$ through $P_6$), the movement 35 is segmented and in each segment, the cursor movement includes a first cursor location (not shown in FIG. 2) and a last cursor location (which is represented by the "○" symbol in FIG. 2). To compress the cursor movement 35, the cursor synchronizer 22 only retains the last cursor location in each sync piece for multi-casting to the agents while compressing all other cursor locations or movements within each sync piece. This significantly reduces information to be transmitted via the network 11. FIG. 3 also shows the compression scheme carried out by the cursor synchronizer 22, which will be described in more detail below.

As can be seen from FIG. 3, only the last cursor location within each sync piece is sent to the agents for synchronous display. The remaining cursor movement data is compressed and is not sent. This reduces data traffic along the network 11. As can be seen from FIG. 3, in sync piece 1, three cursor movements or locations are compressed. At the end of the sync piece, the last cursor location within that sync piece is sent to the displays 2 and 3. In sync piece 2, four cursor movements or locations are compressed. In sync piece 3, two cursor movements or locations are compressed.

Referring back to FIGS. 1 and 2, if there occurs a user input event such as button/keyboard action that is mixed with the cursor movement (which is regarded as motion event) in a sync piece, the button keyboard action may not appear on the exact and same location on all of the display systems. This may be due to the fact that the compression typically miss the coordinate information of the action. To ensure that the corresponding button/keyboard action occurs at the same location on all the display systems, the cursor synchronizer 22 employs the To-Location mechanism. The To-Location mechanism is best illustrated in FIG. 2.

As can be seen from FIG. 2, when the captured cursor movement 35 includes a button/keyboard action (indicated by the "□" symbol) within the sync piece $P_4$, the To-Location mechanism causes the cursor synchronizer 22 to insert another last cursor location in the sync piece $P_4$ which is adjacent and prior to the location at which the action is to occur. This last cursor location is not compressed and is also sent to all the agents of the system 10 to indicate the location of the action. Then at each agent, a determination is made to find out if a received last cursor location indicates a button/keyboard action or not. If it indicates such an action, then the agent causes the cursor in the respective display system to reside at the same location before the required button/keyboard action is executed. In doing so, the button/keyboard action is synchronized on all the display systems of the system 10.

Figure 4:
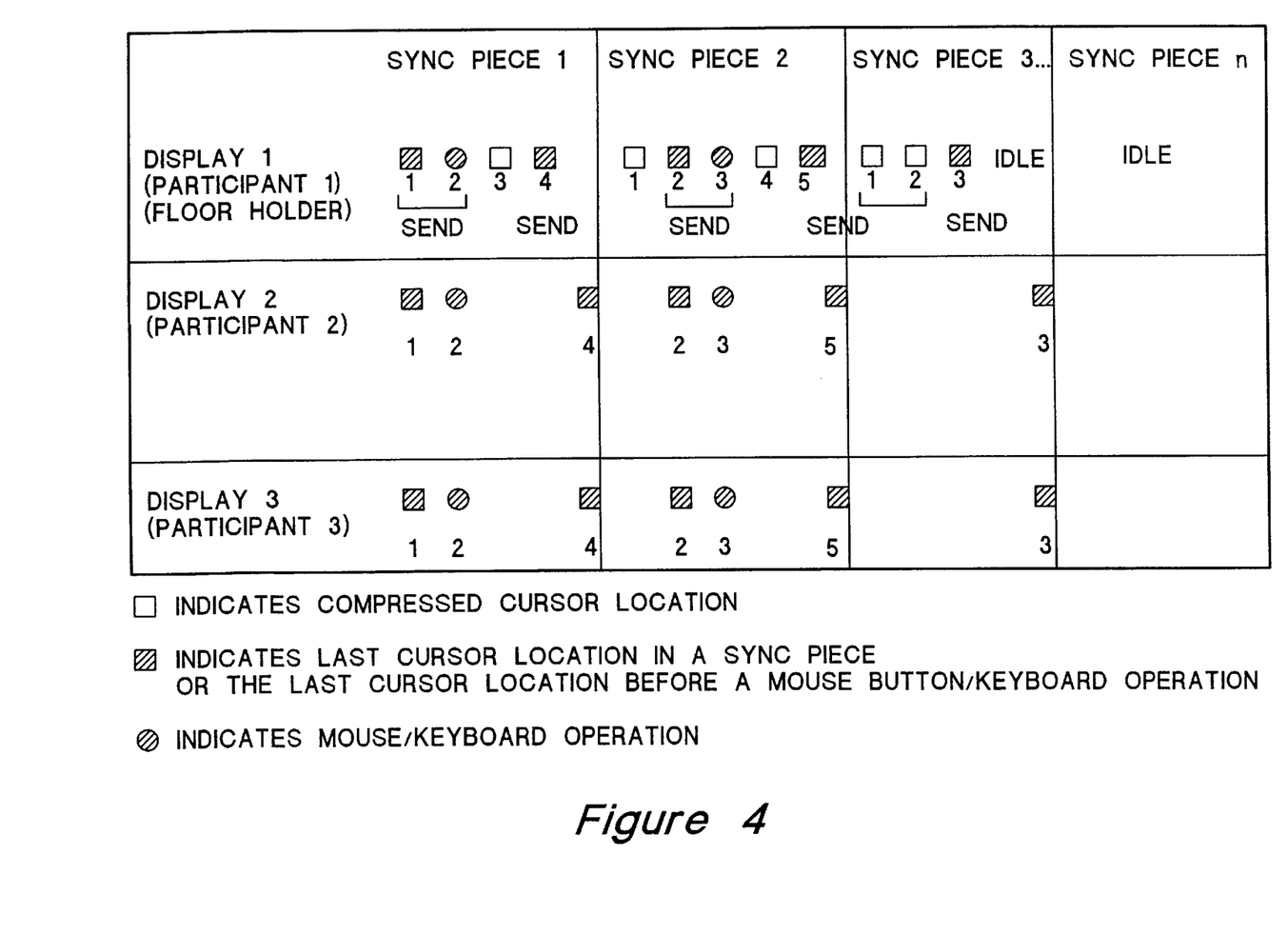
FIG. 4 shows the to-location cursor movement synchronization scheme of the cursor synchronization system of FIG. 1.

FIG. 4 shows in detail the To-Location scheme implemented by the cursor synchronizer 22. As can be seen from FIG. 4, at sync piece 1, the cursor synchronizer 22 causes the location 1 to be another last cursor location and transmits the two last locations (i.e., the locations 1 and 4) and the action to each agent of the system 10. Each agent then adjusts its cursor location to location 1 to indicate the location of the action before causing the action to be executed. At sync piece 2, the cursor locations 2 and 5 are sent by the cursor synchronizer 22 to each agent as the last cursor locations in the sync piece 2 at the end of this sync piece, along with the button/keyboard action. Each agent then adjusts its cursor location to location 2 to indicate the location of the action before causing the action to be executed. At sync piece 3, only the last cursor location 3 is sent to each agent of the system 10 after the floor holder at display 1 becomes idle.

Figure 5:
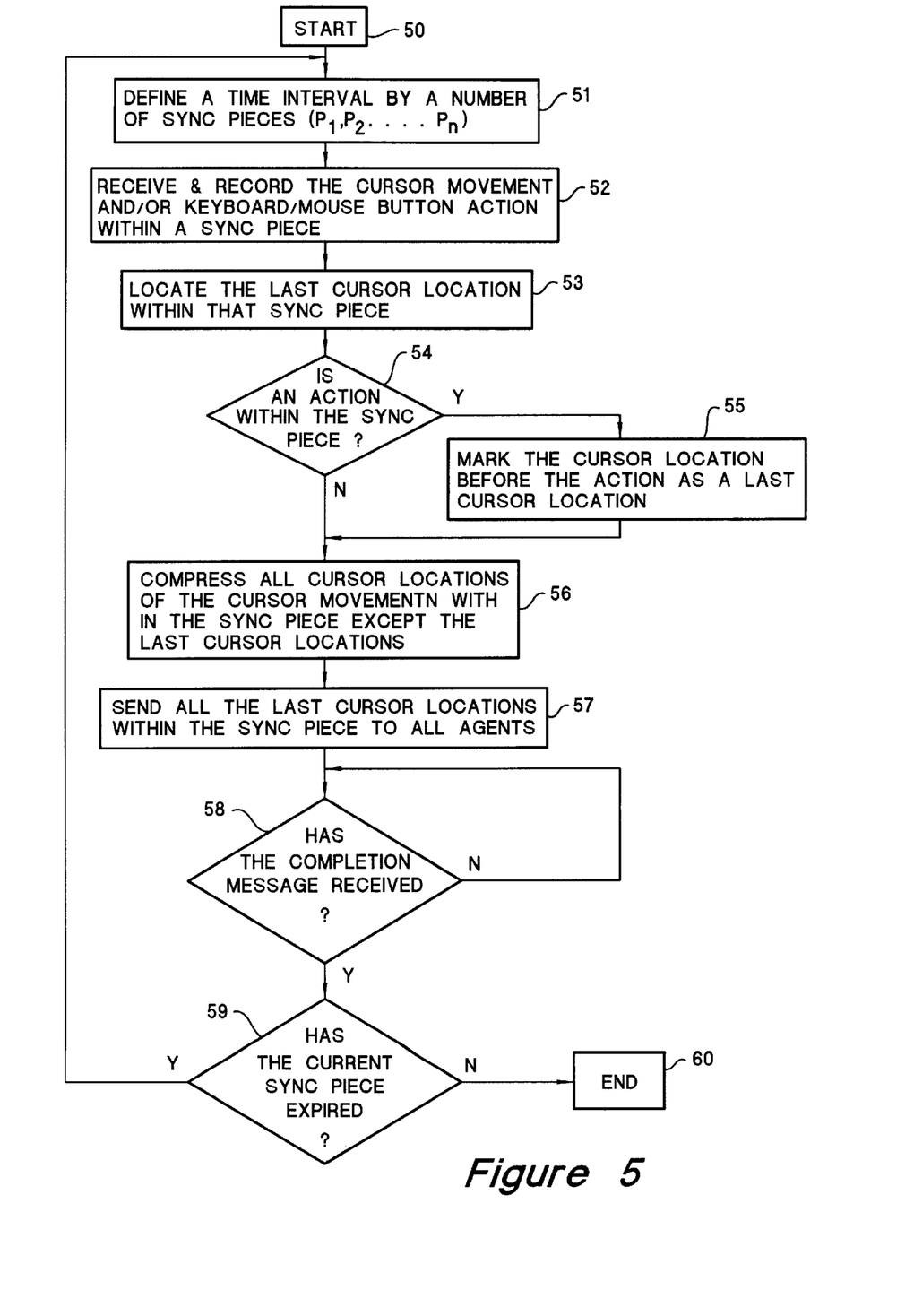
FIG. 5 shows in flow chart diagram form the operation of the cursor synchronizer of FIG. 1.

FIG. 5 shows in flow chart diagram form the cursor synchronization process of the cursor synchronizer 22. As can be seen from FIG. 5, the process starts at the step 50. At the step 51, the cursor synchronizer 22 define a time interval by a number of sync pieces (i.e., sync pieces $P_1, P_2, \ldots, P_n$). This time interval can be adjusted based on previous cursor movement speed. For example, if the user previously moves the cursor fast, the time interval can be longer. In this case, the cursor synchronizer 22 compresses more. If the cursor movement is slow, the time interval can be shorter and the cursor synchronizer 22 compresses less.

At the step 52, the cursor synchronizer 22 receives the data of the cursor movement and/or keyboard/button action within the first sync piece. The cursor synchronizer 22 also records the number of cursor locations within that sync piece. At the step 53, the cursor synchronizer 22 locates the last cursor location of the cursor movement within that sync piece. The process then goes to the step 54 to determine if a keyboard/button action has occurred in that sync piece. If not, then the step 56 is performed. If so, then the step 55 is performed to mark the cursor location right prior to the action as another last cursor location. The process then moves to the step 56.

At the step 56, the cursor synchronizer 22 compresses the captured cursor movement within that sync piece by representing the cursor movement with only the last cursor locations within that sync piece. At the step 57, the cursor synchronizer 22 multi-casts all of the last cursor locations within that sync piece to all the agents (e.g., the agents 21 and 31) of the cursor synchronization system 10. Then the process moves to the step 58 to determine if the cursor movement completion message is received from each of the agents. As described above, the cursor movement completion message indicates to the cursor synchronizer 22 that the multicast cursor locations have been received and displayed. If the completion message is not received in the cursor synchronizer 22, then the step 58 is repeated until the cursor movement completion message is received.

If at the step 58 the completion message is received, then the step 59 is performed to determine if more cursor movement and/or keyboard/button action is detected at the next sync piece. If so, the process returns to the step 52 at which the cursor synchronizer 22 processes the cursor movement and/or action in the next sync piece. If not, the process ends at the step 60.

Figure 6:
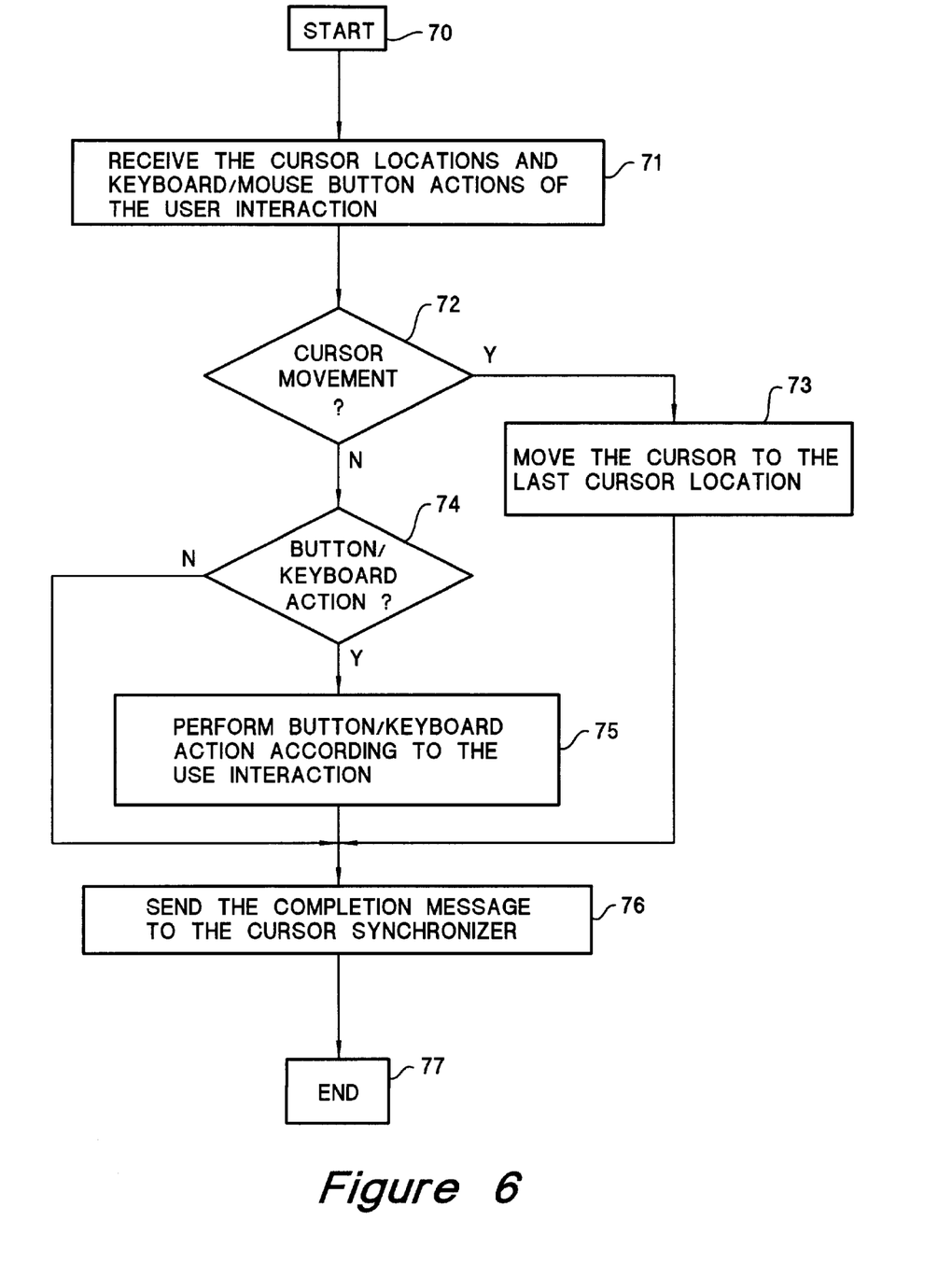
FIG. 6 shows in flow chart diagram form the operation of each of the agents of FIG. 1.

FIG. 6 shows in flow chart diagram form the process performed by each of the agents (e.g., the agent 21 or 31) to synchronously display the cursor movement and/or keyboard/button action. As can be seen from FIG. 6, the process starts at the step 70. At the step 71, all last cursor locations and/or keyboard/button actions is received in each agent. The cursor movements and button actions are all referred to as the user interactions. Then the step 72 is performed to determine if a received user interaction is for cursor movement. If the answer is yes, then the step 73 is performed to display the cursor movement to the last location on the agent's corresponding display system as indicated by the interaction. Then the process goes to the step 76.

If, at the step 72, it is determined that the user interaction is not for cursor movement, then the step 74 is performed to determine if the user interaction is for button/keyboard action (i.e., indicates a keyboard/button action). If the answer is yes, then the step 75 is performed at which the agent causes the designated button/keyboard action to be performed on its respective display system. If, at the step 74, it is determined that the data is not for button/keyboard action, then the process moves to the step 76.

At the step 76, the agent sends the complete message to the cursor synchronizer 22. The process then ends at the step 77.

In the foregoing specification, the invention has been described with reference to specific embodiments thereof It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A cursor synchronization system for synchronously displaying a cursor on a plurality of display systems connected together via a network, comprising:

(A) a plurality of agents, each being coupled to one of the display systems to cause the respective display system to display a compressed cursor movement wherein each of the agents does not generate any control request;

(B) a cursor synchronizer coupled to the agents wherein the cursor synchronizer captures and compresses the cursor movement generated from an external cursor generator within a predetermined time interval, wherein the cursor synchronizer synchronously sends the compressed cursor movement to each of the agents such that the cursor movement is synchronously displayed on each of the display systems with minimized network traffic through the network, wherein the agents only receive the compressed cursor movement from the cursor synchronizer and do not provide any cursor movement or control request input to the cursor synchronizer.

2. The cursor synchronization system of claim 1, wherein each of the agents also triggers concurrent execution among a plurality of existing applications within the display systems without requiring sharing of memory or database.

3. The cursor synchronization system of claim 1, wherein the cursor synchronizer compresses the cursor movement within the predetermined time interval by defining the predetermined time interval as a plurality of time periods and using a last cursor location of the cursor movement within each of the time periods to represent the cursor movement.

4. The cursor synchronization system of claim 3, wherein the cursor synchronizer synchronously sends the compressed cursor movement to each of the agents by sending all the last cursor locations within each of the time periods, one period at a time, to the agents.

5. The cursor synchronization system of claim 4, wherein after the cursor synchronizer sends all the last cursor locations of the cursor movement within a particular time period to all the agents, the cursor synchronizer does not send all the last cursor locations of the cursor movement within an adjacent time period of the particular time period unless the cursor synchronizer receives a completion message from each of the agents.

6. The cursor synchronization system of claim 5, wherein each of the agents sends the completion message to the cursor synchronizer once the agent has received and displayed all the last cursor locations of the cursor movement within anyone of the time periods.

7. The cursor synchronization system of claim 4, wherein if a button/keyboard action occurs within one of the time periods, the cursor synchronizer treats the cursor location right before the button/keyboard action as another last cursor location within that time period such that the button/keyboard action occurs at the same location on all of the display systems.

8. The cursor synchronization system of claim 1, wherein the cursor synchronizer further comprises (a) a module that defines the predetermined time interval as a plurality of time periods;

(b) a compressor that compresses the cursor movement by only transmitting the last cursor locations of the cursor movement within each of the time periods of the predetermined time interval to each of the agents;

(c) a to-location synchronizer that, if a button/keyboard action occurs within one of the time periods, causes a cursor location right before the button/keyboard action as another last cursor location within that time period such that the button/keyboard action occurs at the same location on all of the display systems.

9. The cursor synchronization system of claim 1, wherein the predetermined time interval is approximately fifty milliseconds.

* * * * *